(12) United States Patent
Conwell et al.

(10) Patent No.: US 11,159,842 B2
(45) Date of Patent: *Oct. 26, 2021

(54) SYSTEM AND METHOD FOR TIMING MANAGEMENT FOR DIGITAL VIDEO RECORDING

(71) Applicant: AT&T Intellectual Property I, L.P., Atlanta, GA (US)

(72) Inventors: Craig M. Conwell, Gulf Breeze, FL (US); Gregory Cooke, Woodstock, GA (US); Alan Collins, Hixson, TN (US); Quan Li, Alpharetta, GA (US)

(73) Assignee: AT&T Intellectual Property I, L.P., Atlanta ( * ) Notice: Subject to any disclaimer, the term of this patent is extended or adjusted under 35 U.S.C. 154(b) by 0 days.

This patent is subject to a terminal disclaimer.

(21) Appl. No.: 16/984,733

(22) Filed: Aug. 4, 2020

(65) Prior Publication Data

US 2020/0366956 A1    Nov. 19, 2020

Related U.S. Application Data

(63) Continuation of application No. 16/022,198, filed on Jun. 28, 2018, now Pat. No. 10,779,032.

(51) Int. Cl.
*H04N 21/433* (2011.01)
*H04N 21/458* (2011.01)
(Continued)

(52) U.S. Cl.
CPC ....... *H04N 21/4334* (2013.01); *H04N 21/435* (2013.01); *H04N 21/44231* (2013.01); *H04N 21/458* (2013.01)

(58) Field of Classification Search
CPC ............ H04N 21/4334; H04N 21/435; H04N 21/44231; H04N 21/458
See application file for complete search history.

(56) References Cited

U.S. PATENT DOCUMENTS 6,208,799 B1   3/2001   Marsh et al.
6,344,878 B1   2/2002   Emura et al.
(Continued)

OTHER PUBLICATIONS

Digital Video Broadcasting (DVB); Guidelines on implementation and usage of Service Information (SI), DVB Document A005, Jun. 2017, the DVD BlueBook A005, pp. 1-61.
(Continued)

*Primary Examiner* — Mishawn N. Hunter
(74) *Attorney, Agent, or Firm* — Guntin & Gust, PLC; Douglas Robert Schnabel

(57) ABSTRACT

Aspects of the subject disclosure may include, for example, identifying a media program and receiving a digital media stream including metadata and payload data, wherein the payload data includes program content of the identified media program. The metadata further includes program event information and program status information related to the identified media program. A recording status of the identified media program is determined, wherein an active recording status indicates the identified media program is being recorded at a media recorder. Responsive to the active recording status, an end of program is determined according to the identified media program, the program event information and the program status information. Responsive to the end of program, termination of the recording of the media program is initiated. Other embodiments are disclosed.

20 Claims, 10 Drawing Sheets

(51) Int. Cl.
    *H04N 21/435*     (2011.01)
    *H04N 21/442*     (2011.01)

(56) References Cited

U.S. PATENT DOCUMENTS

| | | |
|---|---|---|
| 6,489,999 B1 | 12/2002 | Okabe et al. |
| 7,581,238 B1 | 8/2009 | Taylor et al. |
| 7,600,246 B2 | 10/2009 | Taylor et al. |
| 7,640,564 B2 | 12/2009 | Green et al. |
| 7,743,398 B2 | 6/2010 | DeYonker et al. |
| 7,764,865 B2 | 7/2010 | Van et al. |
| 8,281,341 B2 | 10/2012 | Ellis et al. |
| 8,380,050 B2 | 2/2013 | Kummer et al. |
| 8,385,723 B2 | 2/2013 | McClanahan et al. |
| 8,532,466 B2 | 9/2013 | Bumgardner et al. |
| 8,761,584 B2 | 6/2014 | Mankovitz et al. |
| 9,137,475 B2 | 9/2015 | Adimatyam et al. |
| 9,253,462 B2 | 2/2016 | Kummer |
| 9,549,213 B2 | 1/2017 | Templeman et al. |
| 9,800,937 B2 | 10/2017 | Newell et al. |
| 2004/0078817 A1 | 4/2004 | Horowitz et al. |
| 2004/0107447 A1 | 6/2004 | Katagishi et al. |
| 2004/0190864 A1 | 9/2004 | Tannenbaum et al. |
| 2005/0229225 A1 | 10/2005 | Klausberger et al. |
| 2005/0259962 A1 | 11/2005 | Sano et al. |
| 2007/0127882 A1 | 6/2007 | Yamada et al. |
| 2007/0136751 A1* | 6/2007 | Garbow ............ H04N 21/4316 725/46 |
| 2009/0245758 A1 | 10/2009 | Kodama et al. |
| 2010/0260473 A1 | 10/2010 | Newell et al. |
| 2011/0103774 A1 | 5/2011 | Howarter et al. |
| 2011/0242270 A1* | 10/2011 | Dinka ............... H04N 7/173 348/14.11 |
| 2011/0247040 A1 | 10/2011 | Zhou et al. |
| 2012/0069146 A1 | 3/2012 | Lee et al. |
| 2012/0183276 A1 | 7/2012 | Quan et al. |
| 2014/0270717 A1 | 9/2014 | Chen et al. |
| 2015/0281778 A1 | 10/2015 | Xhafa et al. |
| 2016/0227281 A1 | 8/2016 | Abuelsaad et al. |
| 2016/0309227 A1 | 10/2016 | Casagrande |
| 2017/0034571 A1 | 2/2017 | Natarajan et al. |
| 2018/0063595 A1 | 3/2018 | Lo et al. |
| 2020/0007927 A1 | 1/2020 | Conwell et al. |

OTHER PUBLICATIONS

"Cable DVR", mchsi.com, Dec. 6, 2011, pp. 1-7.
"SageTV Add-In Feature: #1 Sage Recording Extender", Home Server Show, homeservershow.com, poster: ohpleaseno, pen., Mar. 1, 2010., pp. 1-7.
Changuel, Nesrine et al., "End-to-end stochastic scheduling of scalable video overtime-varying channels", Proceedings of the 18th ACM international conference on Multimedia, ACM, pp. 731-734, Oct. 2010.

* cited by examiner

| 8:00 PM | NFL – New York Giants vs. Dallas Cowboys | Running Status |
|---|---|---|
| | 1st Quarter: Giants – 7, Cowboys – 3 | Running |
| → | 2nd Quarter: Giants – 17, Cowboys – 13 | Running |
| | 3rd Quarter: Giants – 20, Cowboys – 20 | Running |
| | 4th Quarter: Giants – 23, Cowboys – 23 | Running |
| 6:19 PM | OT: Giants – 23, Cowboys - 26 | Running |
| 6:00 PM | The NEWS at Six on Six | Starts in a few seconds |
| 6:19 PM | NFL – New York Giants vs. Dallas Cowboys | Not Running |
| 6:19 PM | The NEWS at Six on Six | Running |

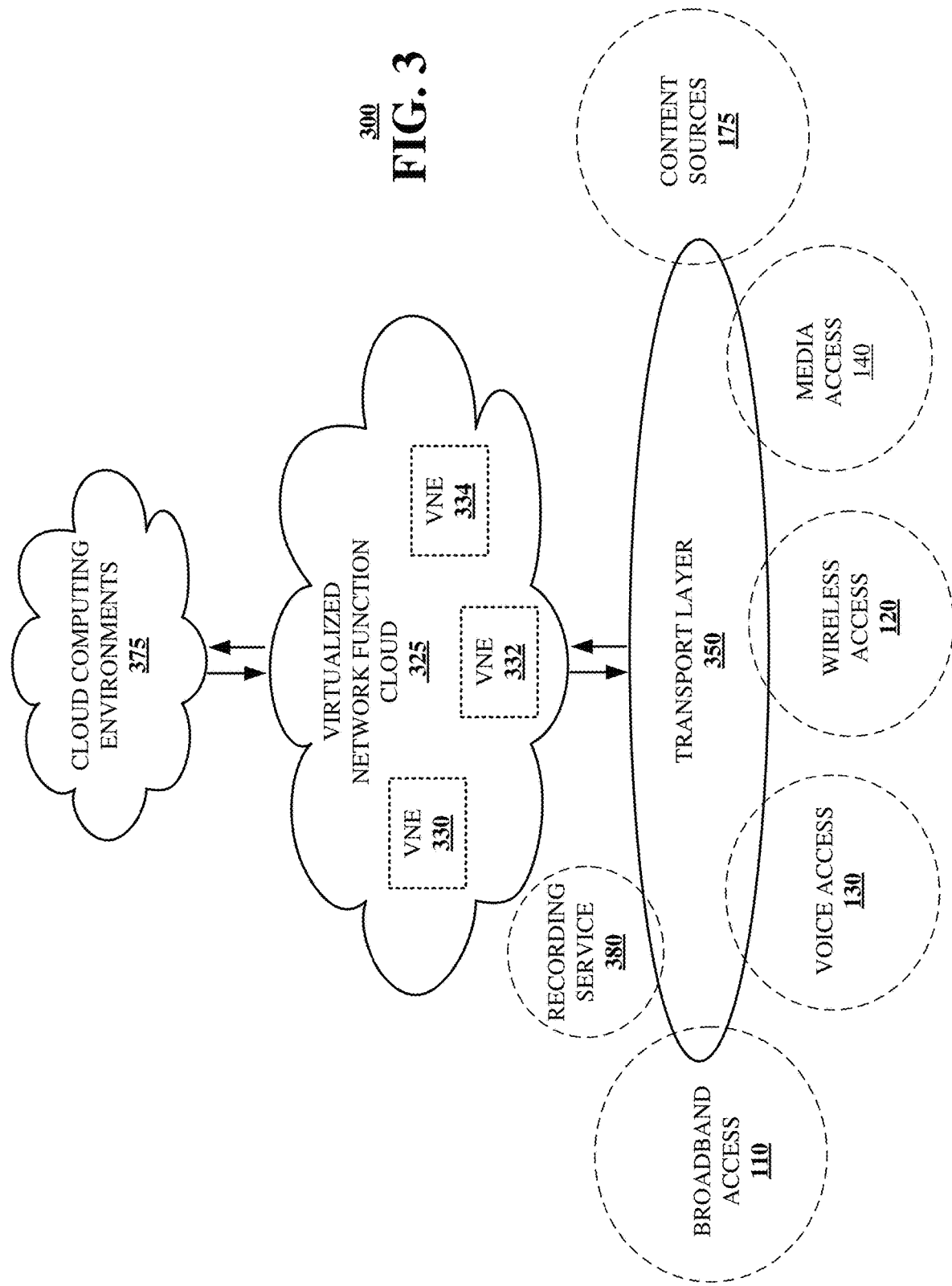

600

SYSTEM AND METHOD FOR TIMING MANAGEMENT FOR DIGITAL VIDEO RECORDING

CROSS REFERENCE TO RELATED APPLICATIONS

This application is a continuation of U.S. patent application Ser. No. 16/022,198 filed on Jun. 28, 2018. The contents of each of the foregoing is/are hereby incorporated by reference into this application as if set forth herein in full.

FIELD OF THE DISCLOSURE

The subject disclosure relates to a system and method for timing management for digital video recording.

BACKGROUND

Trends in the dissemination of media content include digitization and transport via data communication networks, sometimes referred to as streaming media. Such digitization is increasingly applied to the broadcast of both radio and television programming. Streaming media has become increasingly popular due to the wide variety of content and the quality of content available, coupled with advances in storage, processing and bandwidth. Streaming media transport networks include, without limitation, traditional cable, terrestrial wireless, mobile cellular, Internet Protocol (IP), and satellite.

End user equipment for consuming digital media typically includes a media processor, e.g., a set-top box that is used to receive the digital media signals and decode the signals for use on a presentation device, such as a television, a computer, a laptop, a mobile phone, a gaming system, a radio, and the like. The media processor typically has a memory associated therewith. The memory may include a digital video recorder (DVR) or the like as well as the operating code for the media processor.

Media broadcast systems, e.g., digital video broadcast systems, typically broadcast content to a number of users simultaneously. Broadcast services can offer subscription and/or pay-per-view access to broadcast content. Access can be provided using signals broadcast over the transport network. Once access is provided a user or subscriber can access the particular content. The broadcasting of a large selection of channels and/or pay-per-view programs uses a considerable amount of transport resources. Such content may be received and stored by a DVR for later viewing. For example, a subscriber may choose to record a particular program according to a program line-up of a particular channel. Service providers can provide electronic programming guides that allow users to select content for current consumption, to plan future viewing events and/or to schedule or otherwise coordinate recording of digital media, e.g., using a DVR.

Although most media broadcasts adhere to schedule program times, e.g., scheduled start times, set durations, and/or scheduled end times, some events are less determinable. For example, sporting events and other live events may also be available to customers in a package. In some instances program start and/or stop times may be flexible. Namely, a particular start and/or stop time may depend on an outcome of a particular event, and/or progress of the event. For example, some sporting events, such as football or basketball, are played according to a game clock. Although a game may start at a predetermined, programmed or scheduled time, the end time and/or duration of the game is likely indeterminable at the outset, because the game clock starts and stops according to a progression of the game. Similarly, some events may include extra program segments, such as overtime in sporting events, which depends upon a progression of the game.

BRIEF DESCRIPTION OF THE DRAWINGS

Reference will now be made to the accompanying drawings, which are not necessarily drawn to scale, and wherein:

FIG. 2B depicts an example of a prior art digital video broadcast service information table.

FIG. 3 is a block diagram illustrating an example, non-limiting embodiment of a virtualized communication network in accordance with various aspects described herein.

DETAILED DESCRIPTION

Figure 1:
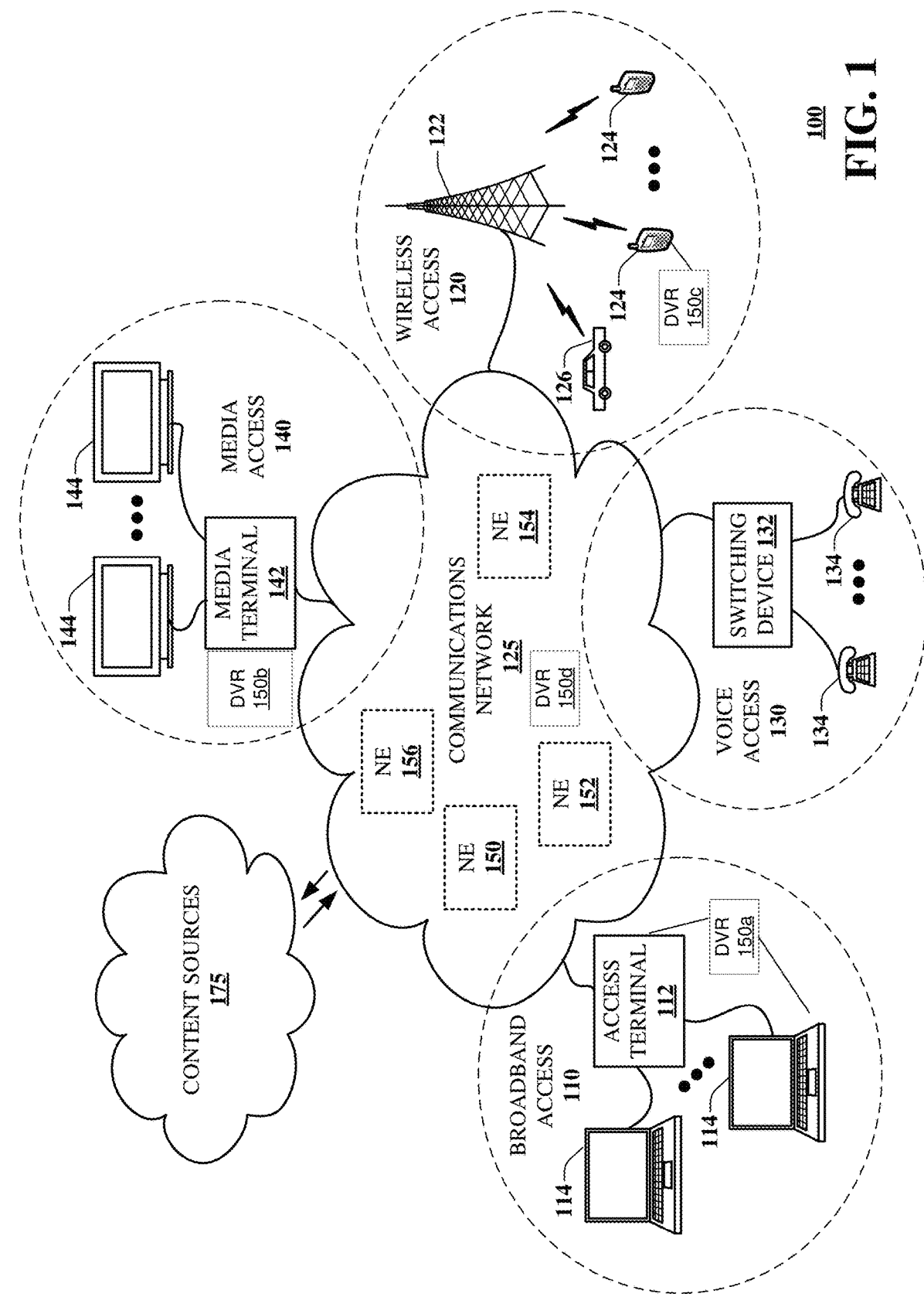
FIG. 1 is a block diagram illustrating an example, non-limiting embodiment of a communications network in accordance with various aspects described herein.

The subject disclosure describes, among other things, illustrative embodiments for initiating and/or terminating a recording of a media presentation of an event based on metadata provided in a digital video stream that contains the media presentation itself. The techniques can be used to determine an end of a media presentation, such as a broadcast television program that may be live or recorded but pre-empted, allowing a DVR to start and/or stop at the appropriate time(s). This would allow the viewer to see the full program even if the time runs past the Electronic Program Guide (EPG) schedule. It is understood that the techniques disclosed herein can be applied selectively, e.g., only to media presentations that have exceeded a scheduled duration or end time, or more broadly, e.g., as a default recording control for every recorded media presentation. Other embodiments are described in the subject disclosure.

One or more aspects of the subject disclosure include a device, including a processing system having a processor and a memory that stores executable instructions. The instructions, when executed by the processing system, facilitate performance of operations. The operations include identifying a media program to obtain an identified media program having a scheduled start time and scheduled end time. A digital media stream comprising metadata and payload data is received, wherein the payload data comprises program content of the identified media program, wherein the metadata comprises program event information related to the identified media program and program status information related to the identified media program. A recording status of the identified media program is determined, wherein an active recording status indicates the identified media program is being recorded at a media recorder. A current time exceeding the scheduled end time is determined, and responsive to the active recording status and the current time exceeding the scheduled end time, the metadata is monitored to obtain the program event information and the program status information. An overtime status of the identified media program is determined based on the program event information indicating the identified media program is a current event and the program status information not indicating the current event is not running. Termination of the recording of the identified media program is prevented based on the overtime status. An end of program of the identified media program is determined based on the program event information indicating one of the identified media program is not the current event, the program status information indicating the current event is running, or both, and responsive to the end of program, termination of the recording of the media program is facilitated.

One or more aspects of the subject disclosure include a non-transitory, machine-readable storage medium, including executable instructions that, when executed by a processing system including a processor, facilitate performance of operations. The operations include identifying a media program to obtain an identified media program and receiving a digital media stream comprising metadata and payload data. The payload data includes program content of the identified media program, wherein the metadata comprises program event information related to the identified media program and program status information related to the identified media program. The metadata is monitored to obtain the program event information and the program status information. A recording status of the identified media program is determined, wherein an active recording status indicates the identified media program is being recorded at a media recorder. Responsive to the active recording status, an end of program is determined according to the identified media program, the program event information and the program status information. Responsive to the end of program, termination of the recording of the media program is initiated.

One or more aspects of the subject disclosure include a process that includes identifying, by a processing system including a processor, a media program and receiving a digital media stream including metadata and payload data, wherein the payload data includes program content of the identified media program. The metadata further includes program event information and program status information related to the identified media program. A recording status of the identified media program is determined by the processing system, wherein an active recording status indicates the identified media program is being recorded at a media recorder. Responsive to the active recording status, an end of program is determined by the processing system according to the identified media program, the program event information and the program status information. Responsive to the end of program, termination of the recording of the media program is initiated by the processing system.

Today's DVRs generally rely on an EPG to facilitate starting and/or stopping recordings for the viewer. A substantial problem with this style of scheduling results in missed parts of programs due to unscheduled interruptions or extension of programming such as overtimes and extra innings in sports events. In the past users have possibly had an option to extend recording times for specified intervals. However these "extensions" were often cumbersome to set and would possibly not catch the entire event or even run longer than needed resulting in misused valuable disk space.

Viewers commonly record media programs for cataloging and/or later viewing. Storage is relatively inexpensive, allowing for entire programs, events, and/or channels to be recorded in their entirety. Bulk recording in this manner may ensure that a particular event of interest has been recorded, however, such bulk recording may limit capacity on particular DVR devices. Moreover, such bulk recording will likely burden viewers of the recorded content by requiring them to search the recorded programs for particular events and/or sections of interest. Consider a subscriber that prefers to watch tennis matches that include a particular player or number of players. If an entire event, e.g., Wimbledon is recorded, there may be many matches for which the subscriber has little interest. For example, a subscriber may be interested in matches that include leading players, surging players, players ranked above a particular seed, specific individuals, e.g., Roger Federer, and so on.

The subject disclosure describes, among other things, illustrative embodiments for initiating and/or terminating a recording of a media presentation of an event having a flexible start time and/or stop time that may not be available beforehand. Namely, the start and/or stop times may not be determinable before the actual start and/or stop of the event. In some embodiments, e.g., MPEG streams, metadata is present in the media stream being converted by the DVR. This metadata can include, without limitation, Program Specific Information (PSI). In at least some embodiments, e.g., according to DVB standards, the PSI can include one or more segments, e.g., tables, that the DVR uses to build its own version of an EPG. Such tables have the ability to be changed while an event is being shown and can be used for triggering when the event starts and/or finishes. In at least some embodiments, internal logic of the DVR is adapted to monitor the PSI tables to determine when the event is starting and when it completes. Such real-time monitoring of the PSI offers many advantages, such as eliminating poor disk utilization of programming that is not necessarily desired by the user. It is envisioned that the application of start and/or end of program logic could be used, e.g., licensed, by a service provider, such as a network service provider, a media service provider, to device suppliers, e.g., DVR manufacturers, and/or to third party recording management service providers.

Referring now to FIG. 1, a block diagram is shown illustrating an example, non-limiting embodiment of a communications system 100 in accordance with various aspects described herein. For example, communications system 100 can facilitate in whole or in part control of a media recording device to initiated one or more of a recording start time, a recording end time, or both, based on metadata contained within a media stream. For example, with respect to digital video broadcasts, a determination whether recording should begin, end, or continue past a predetermined end time or duration, can be based on a current program identified in an event information table and a running status identified in a running status table. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/ video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In various embodiments, the communications system 100 includes one or more media recording controllers 150*a*, 150*b*, 150*c*, 150*d*, generally 150 in accordance with various aspects described herein. The media recording controllers 150 can include, without limitation, one or more of standalone DVRs 150*a*, media processor, e.g., set-top box/DVR combinations 150*b*, and/or mobile communications/DVR combinations 150*c*. Alternatively or in addition, the DVRs 150*d* can be remote from the media processors, e.g., a networked or cloud-based DVR accessible by the media processors via the communications network 125.

In some embodiments, the media recording controller 150 is included within or combined with a DVR function that performs the recording and/or playback of the recorded media content. Alternatively or in addition, the media recording controller 150 is separate from the DVR function. According to separation of the recording control and the DVR, the media recording controller 150 can be collocated with one or more of a media processor, a DVR, a communications device. In some embodiments, the media recording controller is mobile, e.g., communicating via a wireless access network 120.

It is further understood that in some embodiments, the media recording controller 150 is dedicated to a particular DVR. Alternatively or in addition, the media recording controller 150 can service multiple DVRs of an individual subscriber, of a family, e.g., according to a family subscription plan, a business or other organization, and so on. In at least some embodiments, the media recording controller 150 services multiple DVRs, e.g., across different subscribers, businesses, organizations and the like.

For example, communications network 100 can facilitate in whole or in part control of a media recording device to initiated one or more of a recording start time, a recording end time, or both, based on metadata contained within a media stream. For example, with respect to digital video broadcasts, a determination whether recording should begin, end, or continue past a predetermined end time or duration, can be based on a current program identified in an event information table and a running status identified in a running status table. It is understood that in at least some embodiments, a single media recording controller 150 can monitor multiple programs within a common stream, e.g., providing multiple recording control signals to multiple DVR functions. The multiple recorder control signals can be provided contemporaneously, sequentially, and in at least some instances, independently and without regard to other recorder control signals.

Figure 2A:
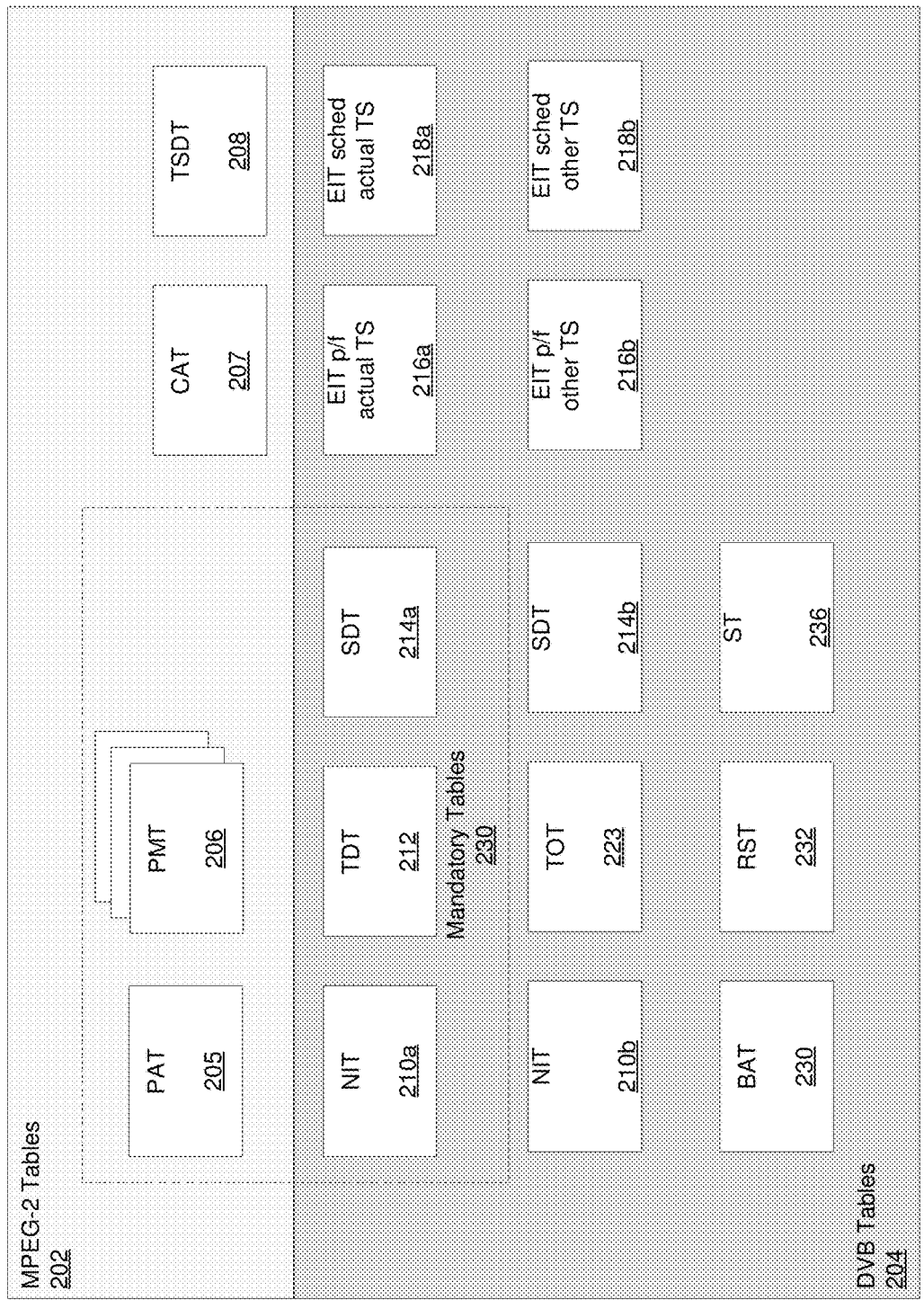
FIG. 2A depicts an example of Event Information Table (EIT) information in accordance with the various aspects described herein.

FIG. 2A depicts an example prior art Service Information (SI) table information 200 according to the Digital Video Broadcasting (DVB); Guidelines on implementation and usage of Service Information (SI), DVB Document A005, June 2017, the "DVD BlueBook A005." The information identified in the SIT table information 200 is provided within a transport stream that can also include program content, e.g., media content items referred to within the SIT table information 200. A transport stream can encapsulate one or more sub-streams, e.g., packetized elementary streams (PES), which in turn wrap a main data stream of an MPEG codec, as well as any number of non-MPEG codecs (such as AC3 or DTS audio, and MJPEG or JPEG 2000 video), text and pictures for subtitles, tables identifying the streams, and even broadcaster-specific information such as an electronic program guide. It is understood that multiple program streams may be associated with the same program, e.g., multiple angles of a movie.

Without restriction, the SI table information 200 can be used in DVB-SI coding in a DVB digital TV environment including satellite-cable- and terrestrial networks. In particular the SI table information 200 includes an MPEG-2 table portion 202 and a DVB table portion 204. The MPEG-2 table portion 202 includes a Program Association Table (PAT) 205, listing programs available in the transport stream. Each program is identified by a value, e.g., a program number. The MPEG-2 table portion 202 also includes one or more Program Map Tables (PMT) 206. The PMTs 2006 include information about programs, with each program having one PMT 206. It is understood that in at least some applications, e.g., according to pure Digital Satellite News Gathering (DSNG) transmissions, only the PAT 205, PMT 206 and TSDT 208 need to be present.

The MPEG-2 table portion 202 can include a Conditional Access Table (CAT) 207 and, optionally, a Transport Stream Description Table (TSDT) 208. The CAT 207 that can be used for conditional access management of cypher keys used for decryption or restricted stream and can be used by a service provider to maintain regular key updates. If the TSDT 208 is present, at least one transport stream descriptor shall be present at the beginning of the descriptor loop. The compatibility of a transport stream with different MPEG-based systems shall be indicated by the presence of more than one transport stream descriptor.

Other so called mandatory tables 230 of the SI table information 200 include one or more Network Information Tables (NIT) 210a, 210b, which provide groupings of Transport Streams (TSs) and relevant tuning information, a Time and Date Table (TDT) 212, which transmits the actual UTC-time coded as Modified Julian Date (MJD), and one or more Service Description Tables (SDT) 214a, 214b, which are used to list the names and other parameters of the services within TSs.

Still other tables of the DVD tables portion 204 of the SI table information 200 include a Time Offset Table (TOT) 223, which transmits the actual UTC-time including time offset information coded as MJD, e.g., usable to synchronize an internal clock of a device, such as an Integrated Receiver Decoder (IRD), a Stuffing Table (ST) 236, which can be used to replace or invalidate sub-tables and/or complete SI tables.

Other portions of the DVB tables 204 particularly relevant to the techniques disclosed herein include an Event Information Table, present following (EITp/f) information 216a, 216b, generally 216, EIT Schedule information (EIT/Schedule) information 218a, 218b, generally 218, and a Running Status Table (RST) 232. The EITp/f 216 is used to transmit information about present, following and further future events. For each service a separate EITp/f sub-table exists, e.g., EITp/f 216a, EITp/f 216b. The EITp/f 216 is mandatory in at least some applications. A first EITp/f 216 having a first section number is reserved for a description of a present event, and another, e.g., subsequent, section number for a following event. At each instance of time, there is at most one present event. The first section number can be empty if there is no present event, e.g., in the case of a gap in a schedule or program lineup. According to the EIT/Schedule 218, each segment contains information about events that start anywhere within a three-hour period, with information about separate events ordered chronologically within segments. The placing of events in segments is done referring to a reference time, to, e.g., "last midnight" in Universal Time Coordinated (UTC) time.

The RST 232 is used to rapidly update a running status of one or more events. According to some DVB standards, the RST 232 is sent only once, at a time a status of an event changes. This is different from other SI tables, which are typically transmitted repeatedly. At the moment the RST is transmitted to update a running status of a particular event, it invalidates the running status of that event provided previously. A following time that an EIT 226 is transmitted, it contains the updated running status information. Example running status field entries include: "running," "not running," "pausing," "starts in a few seconds," and "service off-air." According to a running status field entry of "undefined," IRDs and recording devices shall treat the present event as running. According to a running status field entry of "running," IRDs and recording devices shall treat the present event as running. According to a running status field entry of "not running," IRDs and recording devices shall treat the present event as not running, e.g., the event is the present one, but has not started or already ended. According to a running status field entry of "pausing," IRDs and recording devices shall treat the present event as pausing, and so on for the other running status field values.

FIG. 2B depicts in table form an example of a portion of information obtained from metadata described in the digital video broadcast service information table 240. The table 240 includes an event identification column 241, a time value column 242 and a running status column 243. In a first row 244, the event identification column 241 table identifies a present event, namely, "NFL-New York Giants vs. Dallas Cowboys" along with a scheduled start time, i.e., 3:00 PM in the time value column 242. The event identification column 241 identifies a present event, e.g., the football game, and a following event, in this instance, the "NEWS at Six on Six." Entries in the event identification column 241 are obtained via the EITp/f sub-table 216, such that at any instance of time, there is at most one present event, e.g., the football game, and one following event, e.g., the news. Likewise, entries in the running status column 243 are obtained via the RST 232, which is sent only once, at a time a status of an event changes.

The subsequent rows 245a-245d, generally 245, include periodic status updates of the football game. For example, updates are provided for each quarter of the game according to information obtained via the DVB tables 204, e.g., via the EIT/Schedule 218. Although entries in the running status column 243 indicate "running," the information may not be updated, as the RST 232 is sent only once, at a time a status of an event changes. Thus, the "running" status can be copied with confidence from a previous row 245 with the updated game progress information, as any subsequent RST 232 updates are not received. That said, it is envisioned that in some examples, running status are separately provided via the RST 232 with updates of the game progression as identified in the event identification column 241. According to the illustrative example, at the conclusion of each quarter, updated status for sub-segments of the present event, e.g., identifying the just completed program segment or quarter together with a game score at the conclusion of each quarter. An updated running status can be provided by an updated RST 232 and placed into the running status column 243.

Continuing with the illustrative example, it is understood that the football game, which started at 3:00 PM would conclude before 6:00 PM, allowing a media program broadcast of the game to be scheduled between 3:00-6:00 PM, followed by a scheduled news program scheduled to begin at 6:00 PM. However, the game has gone into overtime as indicated at row 246. Accordingly, the game continues beyond the originally scheduled program end time, i.e., 6:00 PM. In this instance, a service provider providing the media content of the game continues to provide media content of the game beyond the originally scheduled end time. It is understood that anyone recording the game would be interested in recording until the actual game conclusion, despite the originally scheduled end time, at least because an outcome of the game would not be available until then.

As illustrated in the DVB service information table 240, an entry in event identification column 241 of row 247 identifies the News at Six on Six as a following event. A scheduled start time of 6:00 PM is provided in the time value column 242 of row 247. In some embodiments, the News at Six on Six can be identified as "Upcoming/Next" or "Delayed" Upcoming, or Next, or some variant to identify it as being a program scheduled to follow a current program that extends beyond a scheduled end time. According to predetermined program lineup, the news becomes the present event at 6:00 PM according to row 247. However, the running status column 243 indicate "Starts in a few seconds." Accordingly, the news program is not being provided in the payload portion of the media stream of otherwise broadcast due to the overtime. Thus, the running status of the football game has not changed from "Running" to "Not Running," despite the current time having exceeded the scheduled program end time, and the news being identified as a presently scheduled event.

Continuing with the illustrative example, row 248 having an entry in the time value column 242 of 6:19 PM, an entry in the event identification column 241 of the football game, and an entry in the running status column 243 of "Not Running" signifies that football game has concluded and that media content of the game is no longer being provided in the media stream. The precise timing of 6:19 PM can be obtained from a current time at which an updated RST 232 was received identifying the change to "Not Running." Likewise, row 249 having an entry in the time value column 242 of 6:19 PM, an entry in the event identification column 241 of the news program, and an entry in the running status column 243 of "Running" signifies that broadcast of the news broadcast has begun and that media content of the news program is now provided in the media stream. Similarly, the precise timing of 6:19 PM can be obtained from a current time at which an updated RST 232 was received identifying the change to "Running."

Figure 2C:
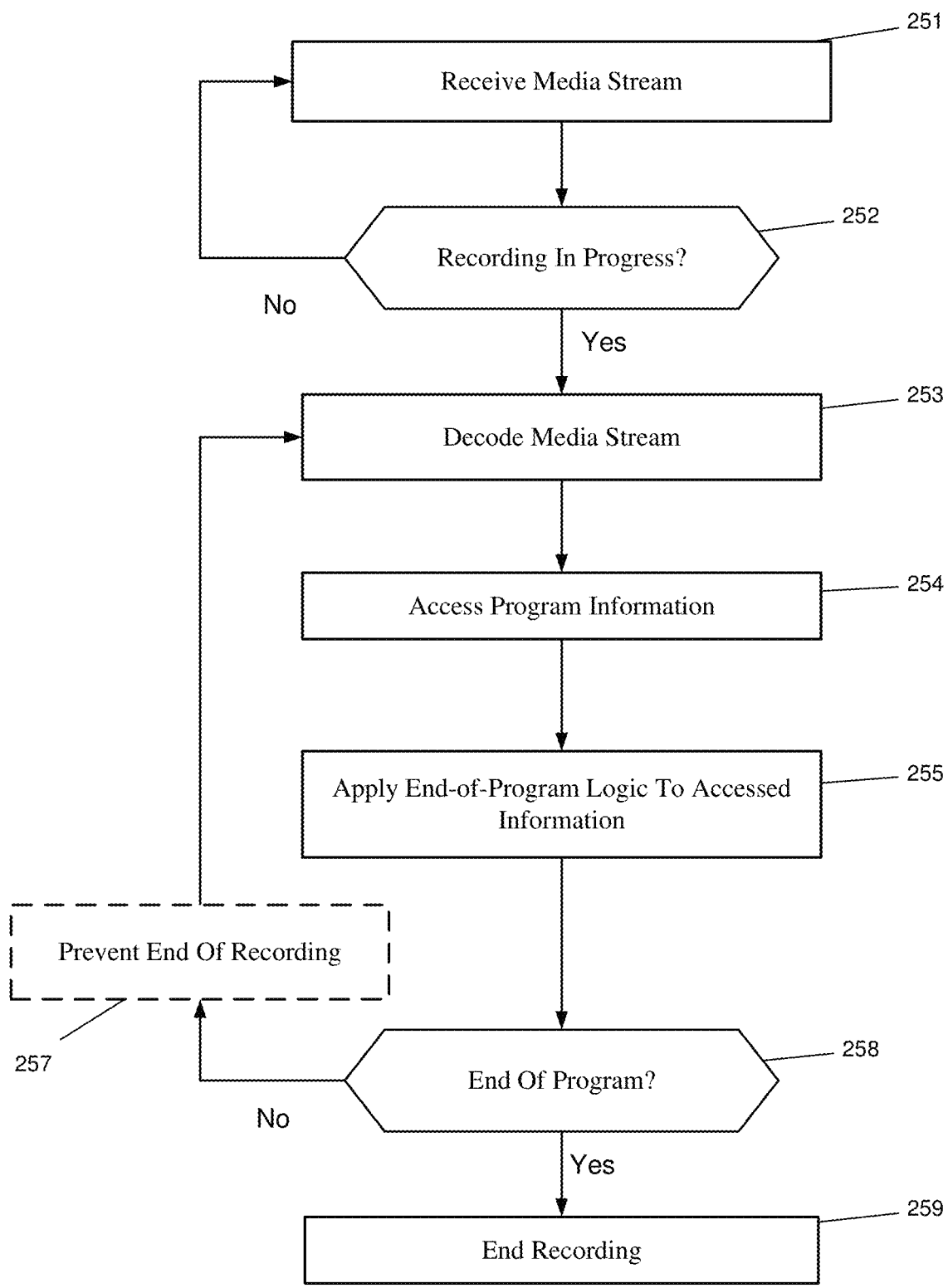
FIG. 2C depicts an illustrative embodiment of a process in accordance with various aspects described herein.

FIG. 2C depicts an illustrative embodiment of a recorder control process 250 in accordance with various aspects described herein. Receiving a media stream at 251. As an initial stem, a determination is made at 252 as to whether a media recording is in progress. This allows the process to be implemented selectively, e.g., only in response to a recording being underway. Such selective processing can promote an efficient use of processing capacity. To the extent the media recording is not in progress, the recorder control process 250 continues from receiving the media stream from 251. However, to the extent it is determined at 252 that recording of the media program is in progress, the process 250 continues by decoding a media stream at 253. It is understood that in at least some embodiments the process can be implemented without regard to a recording status, e.g., determining end-of-program for one or more programs as a routine matter and not necessarily responsive to there being any active recording.

Program information is accessed at 254. The program information is obtained from a media stream, such as a transport stream, e.g., a DVB transport stream. In particular, the program information is obtained from the stream itself, e.g., from the same stream providing the media content. As disclosed herein, the program information can include, without limitation any or all of the information identified in the SI table information 200 (FIG. 2A). End-of-program logic is applied to the accessed information at 255. According to the techniques disclosed herein, the end of program logic can be based on one or more of a program identifier, e.g., a program name, a program ID, a program description, event information of the identified program obtained via the EITp/f 216 and/or EIT/Schedule 218, and information obtained via the RST 232. Information obtained via the RST 232 can include run status information of the identified program, run status information of a present program according to information obtained via the EIT 216, 218, run status information of a following program according to information obtained via the EIT 216, 218, or both.

A determination is made at 258 as to whether an end of program has been reached. In at least some embodiments, this determination can be made by comparing the EIT 216 and the RST 232 to the identified or otherwise selected program to record. As long as there is a three way match then the DVR will continue recording past the end of the scheduled program time. For example, if an identified program is the present program and a run status is not "Not Running", e.g., the run status is "Running" or "Pausing" an end of program has not occurred. However, once there is no longer a three way match, e.g., the recorded program is not the present program, or the RST 232 is "Not Running," an end of program condition can be identified. To the extent that an end of program has not been reached, the recorder control process 250 continues from decoding the media stream at 253. In at least some embodiments, actions can be taken to actively prevent an end of recording at 257. To the extent that an end of program has been reached, actions can be taken to end the recording at 259. For example, a stop recording command can be initiated and/or otherwise provided to the DVR.

Figure 2D:
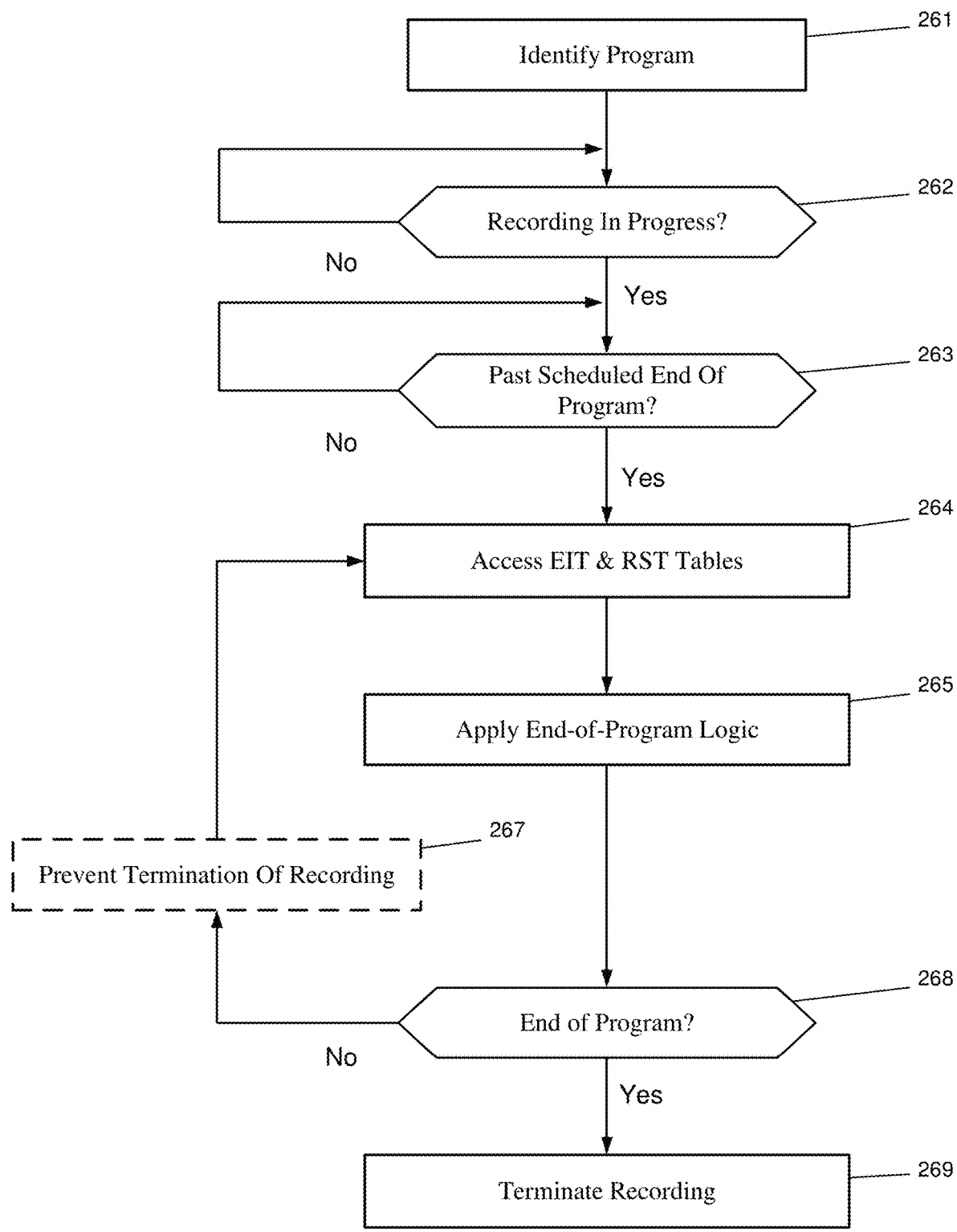
FIG. 2D depicts an illustrative embodiment of another process in accordance with various aspects described herein.

FIG. 2D depicts an illustrative embodiment of another recorder control process 260 in accordance with various aspects described herein. Identifying a program at 261. An initial determination is made at 262 as to whether a recording of the program is in process. Once again, this step is not necessary, but can promote an efficient use of processing resources. To the extent that a recording is not in progress, the process 260 continues by repeating the determining whether a recording of the program is in process at 262.

To the extent it is determined at 262 that a recording of the program is in progress, a determination is made at 263 as to whether current time is past a scheduled end of program time. To the extent that it is not past the scheduled end of program time, the determining whether current time is past a scheduled end of program time at 263 can be repeated. To the extent it is determined at 263 that a current time is past a scheduled end of program time, the recorder control process 260 continues by accessing EIT 216 and RST 232 information obtained via the DVB tables 204.

End-of-program logic is applied at 265 according to the EIT and RST information, for example, as described above in relation to the first example process 250. Namely, recording continues past the end of the scheduled program time as long as there is a three-way match between the selected program, the EIT and RST.

A determination is made at 268 as to whether an end of program has been reached. To the extent that an end of program has not been reached, the recorder control process 260 continues from accessing updated EIT and RST information at 264. In at least some embodiments, actions can be taken to actively prevent an end of recording at 267. For example, issuance of a predetermined stop command according to a scheduled end of program time can be inhibited, deleted or otherwise blocked. Alternatively or in addition, a record command input of a DVR can be temporarily disabled. In many instances, however, no such prevention of a stop recording command is necessary, as recording will naturally continue until a stop recording command is issued. To the extent that an end of program has been reached, actions can be taken to end or otherwise permit termination of the recording at 269. For example, a stop recording command can be initiated and/or otherwise provided to the DVR.

While for purposes of simplicity of explanation, the respective processes are shown and described as a series of blocks in FIGS. 2C and 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2E:
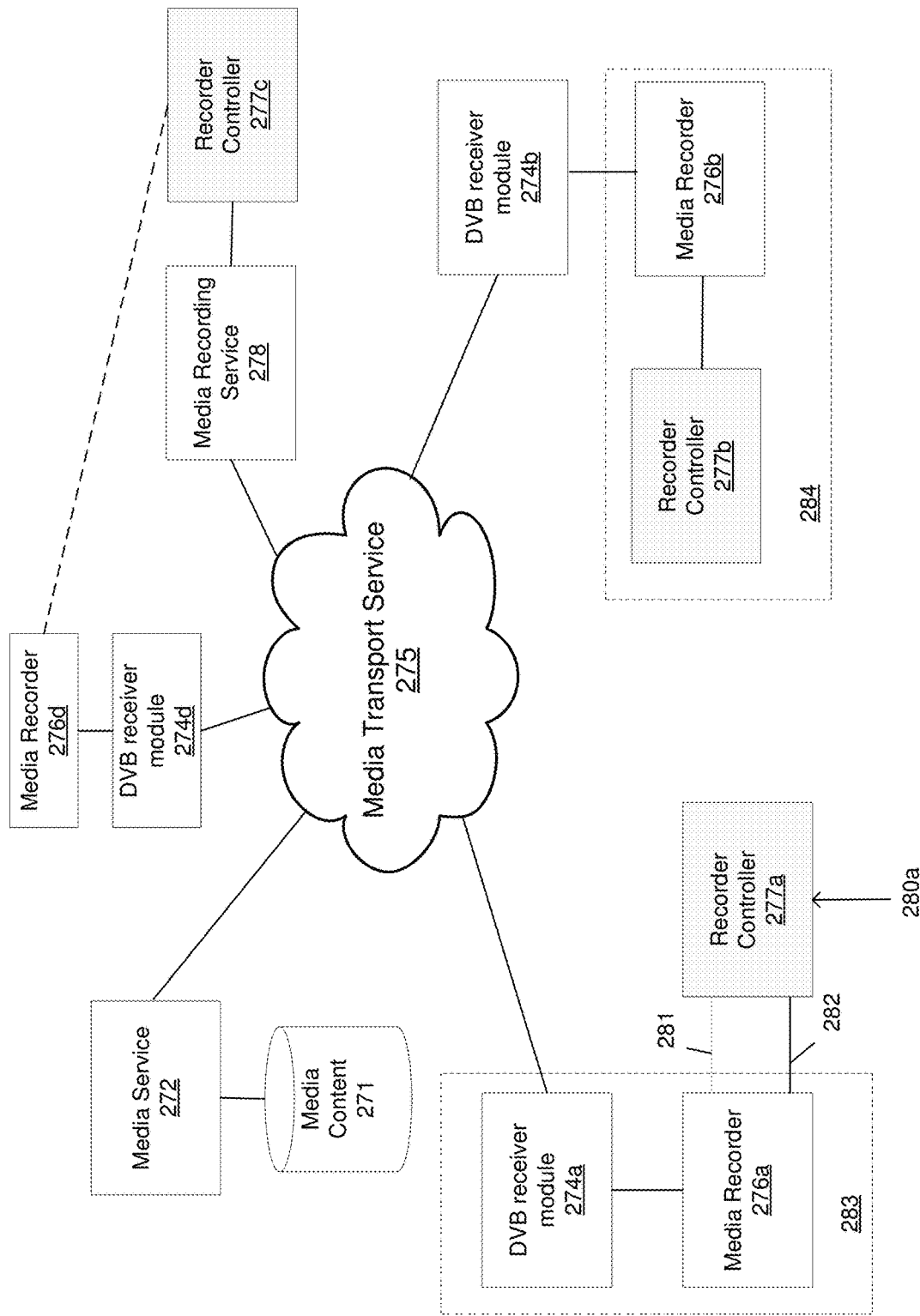
FIG. 2E is a block diagram illustrating an example, non-limiting embodiment of a system functioning within the communication network of FIG. 1 in accordance with various aspects described herein.

FIG. 2E is a block diagram illustrating an example, non-limiting embodiment of a media recording system 270 functioning within the communication network of FIG. 1, in accordance with various aspects described herein. The media recording system 270 includes equipment of a media service provider 272, e.g., a DVB service provider that distributes media content obtained from one or more media content sources 271. The media service can include, without limitation, broadcast services, such as terrestrial broadcast service, multimedia broadcast multicast services, digital video broadcast services, digital audio broadcast services, multicast services, unicast services, e.g., video on demand, radio, streaming apps and the like. Likewise, the media content can include any of the various categories of content disclosed herein or otherwise generally known, e.g., audio, video, file transfers, video gaming, online gaming, advertisements, and the like. Digital content format can include, without limitation, MPEG-1, MPEG-1 audio layer 2, MPEG-2, MPEG-4, JPEG, TIFF, GIF, PNG, and so on.

The media recording system 270 further includes a media transport service 275 that provides media service to one or more media recorders 276a, 276b, generally 276, and/or recording equipment of a media recording service 278. The media transport service 275 can include one or more transport schemes including, without limitation, traditional cable, terrestrial wireless, e.g., wireless local area networks, IEEE 802.11, mobile cellular, e.g., 3GPP LTE, 4G, 5G, Internet Protocol (IP), e.g., IPTV, satellite, and basic wireline, e.g., plain-old-telephone service (POTS).

Equipment of a first media consumer can include a DVB receiver module 271a, e.g., a media processor such as a traditional set-top box of a cable or satellite service. The DVB receiver module 271a is in communication with a media recorder 276a. Without limitation, the media recorder 276a can include a traditional DVR, such as a standalone DVR coupled to the DVB receiver module 271a, a DVR built into the DVB receiver module 271a, e.g., a combined set-top box/DVR 283. It is understood that in at least some applications the DVB receiver module 274a can be provided by a mobile device, such as a mobile communication device, e.g., a smart telephone, a tablet device, a laptop computer, a vehicle, e.g., a vehicle entertainment system, and the like. It is understood that one or more of the DVB receiver modules 274 and/or the media recorders 276 and/or the recorder controllers 277 can be part of a networked or cloud-based DVR, e.g., representing equipment of a media consumer, equipment of a media recording service, or some combination thereof.

According to the techniques disclosed herein, the system 270 also includes a recorder controller 277a. In at least some embodiment, the recorder controller 277a is in communication with the media recorder 276a. In at least some embodiments, the recorder controller 277a can be separate from the media recorder 276a and the DVB receiver module 274a, as shown. Alternatively, a recorder controller 277b can be integrated with a media recorder 276b, e.g., provided within a DVR 284.

It is conceivable that in at least some embodiments, a recorder controller 277c can be separate from a media recorder 276d and separate from a DVB receiver module 274d. For example, a media recording service 278 can monitor media content distributed by one or more media services 272 and/or received by one or more DVB receiver modules 274a, 274b, 274c, generally 274. The recorder controller 277c can determine an end-of-program and disseminate a recording control message to one or more DVB receiver modules 274. In some embodiments, the recording control message from the remote recorder controller 277c is distributed using signaling over the media transport service 275. Alternatively or in addition, the recording control message is distributed by the remote recorder controller 277c via another means, such as a separate communications network. Namely, media content is provided to a media recorder 276d via first network and a recording control message is distributed to the same media recorder 276d via a different network and/or a different service on the same network. Consider a first scenario in which the DVB receiver module 274d receives media content via a traditional cable service, and receives a recording control message via an IP message over a broadband service of the cable provider. Alternatively or in addition, the DVB receiver module 274d receives media content via the traditional cable service, but receives a recording control message via an SMS text message via a mobile cellular service, or a control message via a circuit switched network.

The recorder controller 277a receives information 281 from the media recorder 276a. The information 281 is obtained from streaming media received and decoded by the DVB receiver module 274a, which can include some or all of the metadata, e.g., the information identified by the SI table information 200 (FIG. 2A). The recorder controller 277a is configured to process the information 281 obtained from the streaming media to obtain event information, e.g., via one or more of the EIT tables 216, 218 and the RST 232. The recorder controller 277a combines the obtained information with an identified program and applies an end-of-program logic to determine whether the identified program is currently running, or whether it has ended.

Responsive to the determination, the recorder controller 277a provides a recording control signal 282 to the media recorder 276a. In some embodiments, the recording control signal 282 includes a stop recording command that commands the media recorder 276a to stop recording. It is envisioned that in at least some embodiments, the recording control signal 282 overrides or otherwise replaces any stop recording command that may be associated with a program start time, duration and or scheduled stop time, e.g., according to an EPG. Alternatively or in addition, the recording control signal 282 can include a record signal to re-initiate recording of a recorded program after a pre-programmed stop time based on the program being subject to an overtime scenario, i.e., running past its originally scheduled or anticipated stop time. In at least some embodiments, the recording control signal 282 prohibits the media recorder 276 from stopping recording of a program subject to overtime.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication system 100, the subsystems and functions of system 200, and method 230 presented in FIGS. 1, 2A, 2B, 2C, and 3. For example, virtualized communication network 300 can facilitate in whole or in part control of a media recording device to initiated one or more of a recording start time, a recording end time, or both, based on metadata contained within a media stream. For example, with respect to digital video broadcasts, a determination whether recording should begin, end, or continue past a predetermined end time or duration, can be based on a current program identified in an event information table and a running status identified in a running status table.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
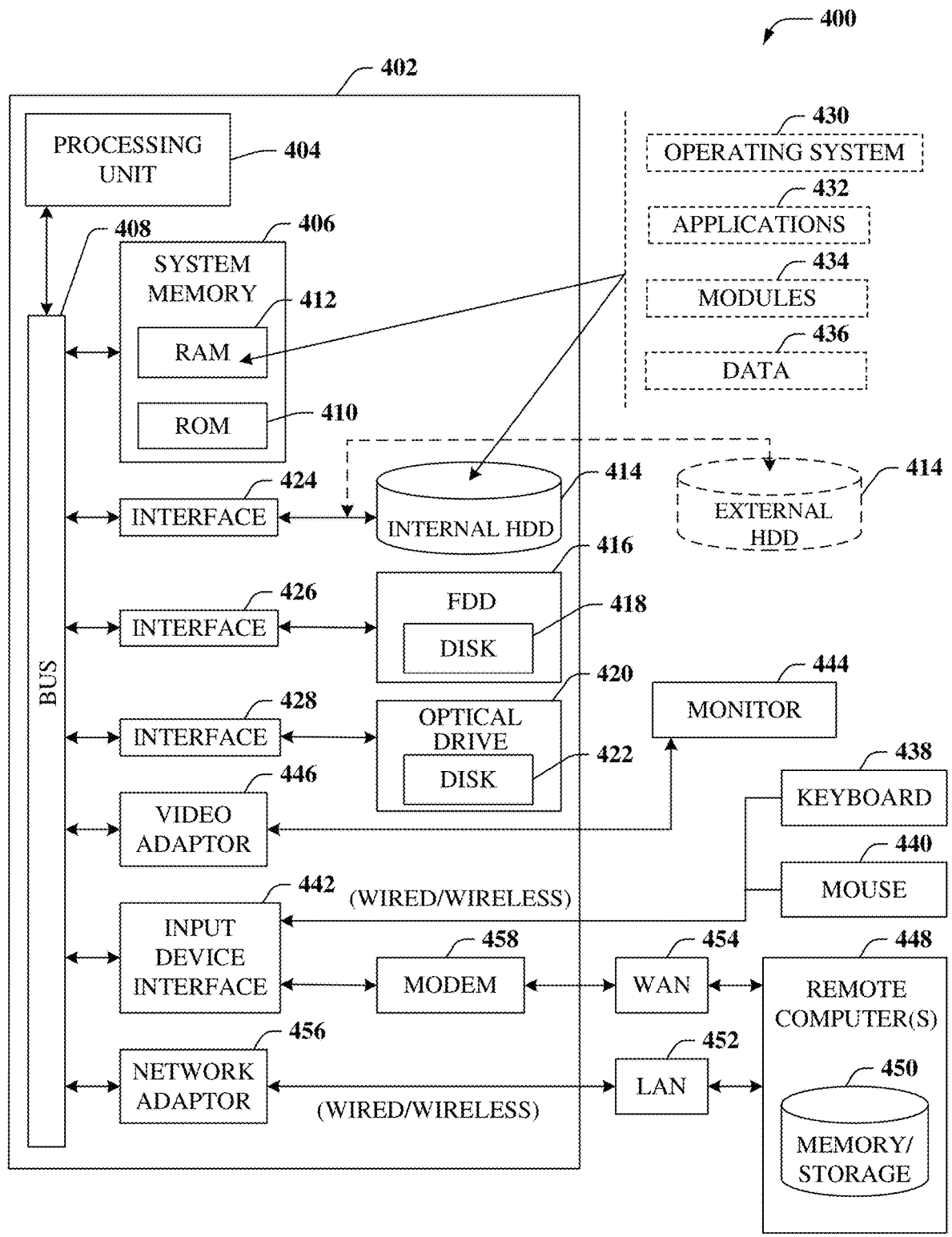
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part control of a media recording device to initiated one or more of a recording start time, a recording end time, or both, based on metadata contained within a media stream. For example, with respect to digital video broadcasts, a determination whether recording should begin, end, or continue past a predetermined end time or duration, can be based on a current program identified in an event information table and a running status identified in a running status table.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
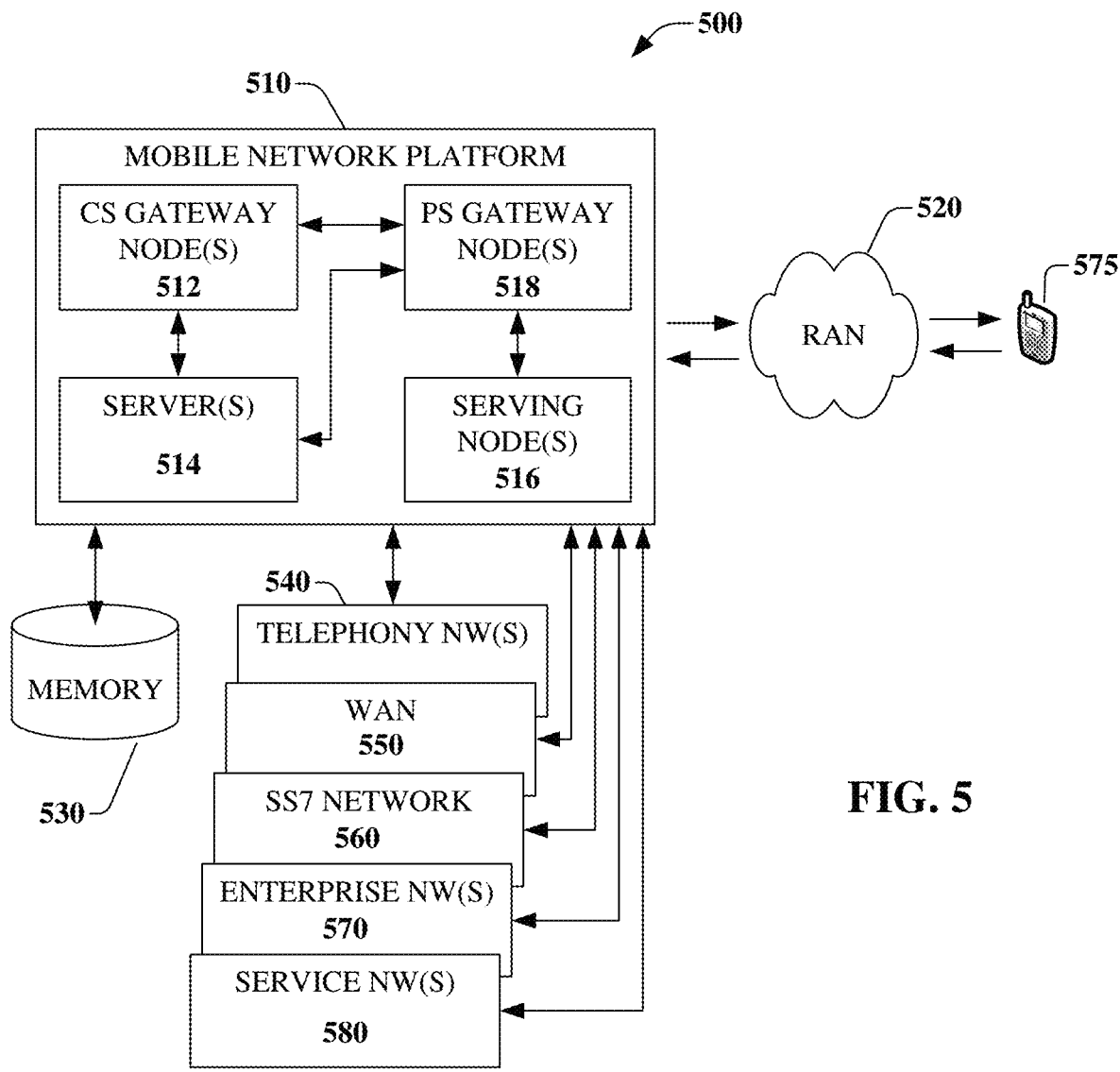
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part control of a media recording device to initiated one or more of a recording start time, a recording end time, or both, based on metadata contained within a media stream. For example, with respect to digital video broadcasts, a determination whether recording should begin, end, or continue past a predetermined end time or duration, can be based on a current program identified in an event information table and a running status identified in a running status table. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory

530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
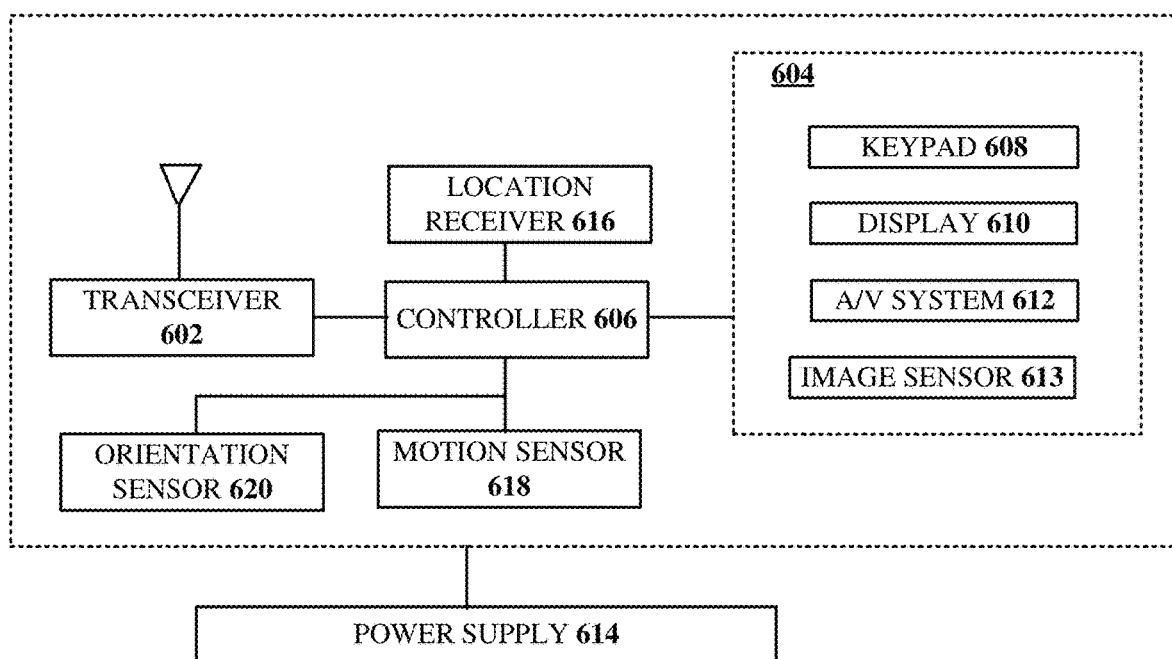
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part control of a media recording device to initiated one or more of a recording start time, a recording end time, or both, based on metadata contained within a media stream. For example, with respect to digital video broadcasts, a determination whether recording should begin, end, or continue past a predetermined end time or duration, can be based on a current program identified in an event information table and a running status identified in a running status table.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/ communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example"

or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and a memory that stores executable instructions that, when executed by the processing system, facilitate performance of operations, the operations comprising:

decoding digital video broadcast (DVB) service information of a digital media stream to obtain program event information and program running information associated with program content of the digital media stream;

determining an identified media program associated with the program content of the digital media stream according to the program event information;

determining a running status associated with the program content of the digital media stream according to the program running information;

determining, according to the running status associated with the program content of the digital media stream, whether there is an indication of a change in the running status from running to not running;

determining whether the identified media program associated with the program content of the digital media stream and a current event associated with a recording are the same, wherein the current event is being recorded by a media recorder;

determining an overtime event based on a combination of the determining that the identified media program associated with the program content of the digital media stream and the current event being recorded at a media recorder are the same and the determining that there is not an indication of a change in the running status from running to not running; and responsive to the determining the overtime event, preventing termination of the recording of the current event at the media recorder.

2. The device of claim 1, wherein the operations further comprise determining a recording status of the recording of a current event at a media recorder, wherein an active recording status associated with the current event indicates that the current event is being recorded at the media recorder.

3. The device of claim 2, wherein the determining the recording status of the recording of the current event further comprises monitoring activity of the media recorder.

4. The device of claim 2, wherein the determining the recording status of the recording of the current event further comprises monitoring a current time, and wherein the active recording status is based on the current time exceeding a scheduled start time of the identified media program.

5. The device of claim 1, wherein the preventing the termination of the recording of the current event further comprises delaying issuance of a recording termination command at the media recorder.

6. The device of claim 1, wherein the operations further comprise facilitating termination of the recording of the current event at the media recorder responsive to the determining an end of program.

7. The device of claim 6, wherein the facilitating termination of the recording of the current event at the media recorder further comprises sending a network message to a remote, network accessible recording device that terminates the recording of the current event at the network accessible recording device.

8. The device of claim 6, wherein the facilitating termination of the recording of the current event at the media recorder further comprises providing a stop recording command to a local recording device that terminates the recording of the current event at the local recording device.

9. The device of claim 6, wherein the facilitating of the termination of the recording of the media program, further comprises providing a stop recording indicator, wherein the media recorder terminates recording of the current event responsive to the stop recording indicator.

10. The device of claim 6, wherein the operations further comprise determining the end of program based on the determining that the identified media program associated with the program content of the digital media stream and the current event associated with the recording are not the same, or the determining that there is an indication of a change in the running status from running to not running, or both.

11. The device of claim 1, wherein the program event information comprises an event information table of the digital media stream, and wherein the running status comprises a running status table of the digital media stream.

12. The device of claim 1, wherein the determining whether the identified media program associated with the program content of the digital media stream and the current event associated with the recording are the same is responsive to a change in the running status associated with the program content of the digital media stream.

13. The device of claim 1, wherein the determining that there is an indication of a change in the running status from running to not running is responsive to a change in the running status associated with the program content of the digital media stream.

14. A non-transitory machine-readable storage medium, comprising executable instructions that, when executed by a processing system including a processor, facilitate performance of operations, the operations comprising: determining an identified media program associated with program content of a digital media stream according to program event information associated with the program content of the digital media stream; determining a running status associated with the program content of the digital media stream according to program running information associated with the program content of the digital media stream; determining, according to the running status associated with the program content of the digital media stream, whether there is an indication of a change in the running status from running to not running; determining whether the identified media program associated with the program content of the digital media stream and a current event associated with a recording are at the same, wherein the current event is being recorded by a media recorder; determining an overtime event based on a combination of the determining that the identified media program associated with the program content of the digital media stream and the current event being recorded at a media recorder are the same and the determining that there is not an indication of a change in the running status from running to not running; and responsive to the determining the overtime event, preventing termination of the recording of the current event at the media recorder.

15. The machine-readable storage medium of claim 14, wherein the operations further comprise decoding digital video broadcast (DVB) service information of the digital media stream to obtain the program event information and the program running information associated with the program content of the digital media stream.

16. The machine-readable storage medium of claim 14, wherein the preventing the termination of the recording of the current event further comprises delaying issuance of a recording termination command at the media recorder.

17. The machine-readable storage medium of claim 14, wherein the operations further comprise facilitating termination of the recording of the current event at the media recorder responsive to the determining an end of program.

18. A method, comprising:
- determining, by a processing system including a processor, a running status associated with program content of a digital media stream according to program running information associated with the program content of the digital media stream;
- determining, by the processing system, according to the running status associated with the program content of the digital media stream, whether there is an indication of a change in the running status from running to not running;
- determining, by the processing system, whether the identified media program associated with the program content of the digital media stream and a current event associated with a recording are the same, wherein the current event is being recorded by a media recorder;
- determining, by the processing system, an overtime event based on a combination of the determining that the identified media program associated with the program content of the digital media stream and the current event being recorded at a media recorder are the same and the determining that there is not an indication of a change in the running status from running to not running; and
- responsive to the determining the overtime event, preventing, by the processing system, termination of the recording of the current event at the media recorder.

19. The method of claim 18, further comprising determining, by the processing system, an identified media program associated with the program content of the digital media stream according to program event information associated with the program content of the digital media stream.

20. The method of claim 19, further comprising decoding, by the processing system, digital video broadcast (DVB) service information of the digital media stream to obtain the program event information and the program running information associated with the program content of the digital media stream.

* * * * *